United States Patent [19]

Van Vonno et al.

[11] 4,040,997

[45] Aug. 9, 1977

[54] METHOD FOR INCORPORATING PROCESSING ADDITIVES IN POLYVINYL CHLORIDE RESINS AND ADDITIVE CONCENTRATE FOR USE THEREIN

[75] Inventors: Nicolaas C. Van Vonno, Mountain Lakes; John O. Allaire, Milford, both of N.J.

[73] Assignee: American Hoechst Corporation, Bridgewater, N.J.

[21] Appl. No.: 665,177

[22] Filed: Mar. 9, 1976

[51] Int. Cl.$^2$ .............................................. C08L 91/00
[52] U.S. Cl. ............................... 260/23 XA; 106/271; 106/272; 260/28.5 D; 260/29.6 PM; 260/45.75 H; 427/222; 428/407
[58] Field of Search ........................ 427/222; 428/407; 260/23 XA, 29.6 PM, 45.75 H, 28.5 D; 106/271, 272

[56] References Cited

U.S. PATENT DOCUMENTS

| 3,067,162 | 12/1962 | Went et al. ........................... 260/34.2 |
| 3,567,669 | 3/1971 | Georgiana et al. ............. 260/28.5 D |
| 3,862,066 | 1/1975 | Reiter et al. ..................... 260/23 XA |

*Primary Examiner*—Melvyn I. Marquis
*Attorney, Agent, or Firm*—Curtis, Morris & Safford

[57] ABSTRACT

Processing additives are incorporated in polyvinyl chloride resin by preparing an additive concentrate in free-flowing powder form and mixing an aliquot portion thereof with a batch of polyvinyl chloride powder in a high shear mixer to form a molding composition containing the additives in the desired proportions. The additive concentrate is made by preparing an aqueous emulsion of the lubricants and stabilizers which is then mixed with solid additives such as pigments and fillers to form the free-flowing additive concentrate powder. By using the additive concentrate the need for individual weighing of each additive to be added to each batch of polyvinyl chloride resin is avoided.

17 Claims, No Drawings

METHOD FOR INCORPORATING PROCESSING ADDITIVES IN POLYVINYL CHLORIDE RESINS AND ADDITIVE CONCENTRATE FOR USE THEREIN

This invention relates to the processing of polyvinyl chloride resins and more particularly to a novel and improved method of incorporating into a particulate polyvinyl chloride molding resin (hereafter PVC) the various additives such as processing lubricants, stabilizers, and the like required to provide a commercially acceptable molding composition. The invention also relates to a PVC additive concentrate in the form of a free-flowing powder adapted to be used for incorporating processing aids into PVC in accordance with the method of the invention, as well as to a method of making such a concentrate.

In the processing of PVC to form a moldable composition it is customary to incorporate into the polymer in dry powder form a variety of special purpose additives to achieve desired processing properties and molded product properties. Thus various natural and synthetic waxes, fatting acids and fatty acid salts are added to improve the processability of the polymer. Stabilizers, which may typically be liquid organo-tin compounds, are added to inhibit thermal and light degradation of the polymer. Pigments, e.g., titanium dioxide, and fillers, e.g., calcium carbonate, are added to improve mechanical properties and the appearance of the molded products. Impact modifiers and processing aids may be added in particular cases to improve impact resistance and melt strength, respectively. The additives are commonly incorporated in the polymer powder in a mixer, usually a high shear mixer, wherein the mechanical working of the material causes its temperature to increase. The proper quantities of the several additives are weighed out and added to the mixer in a predetermined sequence. Typically the liquid stabilizer is added first and dispersed through the polymer powder at a relatively low temperature, after which the lubricants, i.e., the waxes and fatty acid metal salts are added. Usually the lubricant components include at least one wax that is of sufficiently low melting point to be melted in the mixer and become distributed on the surfaces of the polymer powder. Thereafter other additives such as pigments and fillers may be added.

The foregoing procedure is subject to the disadvantage that it requires separate weighings of each additive for each bath of PVC that is mixed, and is thus a rather time-consuming procedure. While it might appear that this problem could be circumvented by simply premixing a large batch of the additives in the proper proportions and incorporating an aliquot portion of the premix with each batch of polymer, it has been found that such a pre-mixing procedure is impractical because the differences in physical properties of the additives produce inhomogeneities in the mixture. Thus the liquid and solid additives tend to produce non-uniform agglomerations either initially or upon storage. The wax lubricants can be melted and the liquid stabilizer added to form a homogeneous melt. However, when such a melt is cooled, a semi-solid paste results that is difficult to handle in either a liquid or solid system. Also after several days' time the stabilizer tends to migrate to the surface of the mass and separate from the wax. A few solid organo-tin stabilizers have been prepared but their low efficiency and high cost greatly limit their use in the highly competitive field of PVC processing. More generally, it has not been found possible to make a sufficiently complete and uniform mixture of the additives that can be handled using present facilities to assure that each portion of the mixture selected for admixture with a batch of PVC will have the same proportions of the different additives. This is critical since some additives are used in the compound in as low a level as 0.1 parts per hundred (phr) of resin.

Various methods of overcoming this problem have been previously proposed. Thus it has been suggested that a masterbatch be prepared by incorporating high concentrations of the additives in a relatively small amount of PVC and using an aliquot portion of the masterbatch for preparing each bath of molding composition. However, this proposal has proven to be impractical because of the fact that only relatively small quantities of the additives can be incorporated in the PVC. High levels of additives result in overlubrication during high shear mixing. The lubricant melts and coats the blades of the mixer reducing the shear heat. A non-uniform lumpy mass results. In order to obtain a homogeneous blend only "double batching" is practical. Double batching involves the addition of twice the desired amount of additives to a given amount of PVC. Following high shear mixing the resin can be mixed with an equal part of unblended resin. The resultant blend is not as uniform as a normally blended resin, but the time saving factor often outweighs this disadvantage.

It has also been suggested in Went et al. U.S. Pat. No. 3,067,162 that a plasticizer be dispersed in a vinyl resin by mixing an aqueous emulsion of plasticizer with an aqueous dispersion of the resin and then de-watering the mixture. However, this process requires the additional step of preparing an aqueous dispersion of the resin and also requires the removal of a relatively large amount of water.

Another prior proposal is disclosed in Reiter et al. U.S. Pat. No. 3,862,066 wherein it is suggested that the additives be mixed with the vinyl chloride monomer prior to polymerization and that the polymerization be carried out in a reaction mixture containing the additives. This proposal is subject to the disadvantage that certain of the additives desirably used in making the polyvinyl chloride molding compositions adversely affect the polymerization reaction and/or the polymerization reaction may reduce the effectiveness of certain of the additives. Also in cases where alkyl tin stabilizers are used, they must be added after the polymerization is complete. Moreover, this method is limited to PVC processors having polymerization facilities.

In the preamble of the Reiter et al. patent there is a reference to a still earlier suggestion which involves dispersing or dissolving the additives in an organic liquid, impregnating the polyvinyl granules with the organic liquid solution or suspension under pressure and then evaporating the solvent. This proposal is subject to the disadvantages that it involves the use of an elevated pressure and also requires the use of an organic solvent which is hazardous and expensive and must be recovered and reused to be economical.

It is accordingly an object of the present invention to provide an improved method of incorporating conventional additives in polyvinyl chloride in the manufacture of polyvinyl chloride molding compounds. It is another object of the invention to provide a method whereby a relatively large quantity of polyvinyl chloride processing additives can be pre-mixed in the proper proportions and the mixture stored or otherwise maintained as a stable finely dispersed mixture of uniform composition until an aliquot portion thereof is required for use in preparing a polyvinyl chloride molding composition. It is still another object of the invention to provide a PVC additive concentrate in the form of a free-flowing powder that is especially adapted to be used as a medium for incorporating the additives in PVC in accordance with the present method. It is a still further object of the invention to provide a novel method of making such a PVC additive concentrate. Other objects of the invention will be in part obvious and in part pointed out hereafter.

The objects of the invention are achieved in general by preparing an aqueous emulsion containing one or more PVC processing lubricants and one or more stabilizers, mixing the emulsion with a finely particulate solid comprising fillers and/or pigments of a type commonly incorporated in PVC molding compositions to form an additive concentrate in the form of a free-flowing powder containing no more than 30% by weight of water, and then mixing an aliquot portion of the additive concentrate with PVC powder in the proper proportions to form a molding composition. The use of the present additive concentrate as a medium for incorporating additives into PVC polymer provides a number of significant advantages. Thus it provides an exceptionally fine dispersion of the lubricant waxes which are not readily available as finely particulate solids and thus improves the dispersion of the waxes in the polymer. It also prevents the agglomeration of liquid and solid additives which occurs on simple mixing of the additives and provides for fine dispersions of both the solid and liquid additives. The additive concentrate can be prepared to contain the proper relative amounts of additives for use in making the molding compositions, and portions thereof can be admixed with the raw polymer powder with the assurance that the proper proportions of the additives will be incorporated in the polymer. It is unnecessary to make separate weighings of each additive for each batch of molding composition. While the additive concentrate is dry to the touch, it still contains a certain amount of water which tends to confer antistatic properties on the final PVC additive blend.

In general any of the lubricants, stabilizers, pigments, fillers and processing aids known to be useful in the compounding of PVC molding compositions can be used in preparing the present additive concentrate. The lubricants commonly comprise one or more types of wax including, for example, hydrocarbon waxes, montan-derived acid waxes, oxidized polyethylene waxes, petrolatum waxes and microcrystalline waxes. Also the lubricant may comprise a fatty acid or salt thereof, particularly the metal salts of higher fatty acids such as the stearates and palmitates of calcium, magnesium, aluminum and zinc. While various stabilizers can be used, the preferred stabilizers are the commercially available liquid organo-tin stabilizers. Useful pigments and fillers include titanium dioxide, calcium carbonate and carbon black. Polymer modifiers such as chlorinated polyethylene and the lower alkyl esters of acrylic and methacrylic acids may also be used.

In carrying out the present method an aqueous emulsion is first prepared containing the lubricant or lubricants and stabilizer. The lubricant may comprise from 10% to 45% by weight of the emulsion, preferably 30% to 40% by weight, and the stabilizer may comprise from 3% to 30% by weight thereof, preferably 10% to 15% by weight. The stability of the emulsion is enhanced by inclusion of surface-active agents and/or emulsifying agents therein. As indicated in the Examples given below, the surface-active agents or emulsifying agents may be organic non-ionic agents or aqueous inorganic alkalies or both. It has been found that the aqueous inorganic alkalies are preferable as emulsifying agents to the amine emulsifying agents often used in wax emulsions, since the aqueous alkali does not cause degradation of the PVC. The emulsifying agent and/or surfactant may be used to the extent of say 0.1% to 5% by weight of the emulsion.

The aqueous emulsion as thus formulated is added to and mixed with a particulate substrate preferably composed of the solid additives that are to be incorporated in the PVC, particularly including the pigments and fillers. The amount of emulsion added to the substrate powder will vary depending upon the nature and state of subdivision of the substrate material and the concentration of disperse phase in the aqueous emulsion. The aqueous emulsion used desirably has a concentration of 30% to 50% by weight of the lubricants and stabilizers. If the substrate comprises one of the widely sold grades of particulate titanium dioxide pigment and calcium carbonate filler, the quantity of added emulsion will usually be within the range 5 to 50 parts per 100 parts of substrate powder. The relative proportions of emulsion and substrate powder should be such that the water content of the mixture does not ordinarily exceed about 30% by weight thereof, except that known anti-caking agents can be used and make it possible to exceed this 30% water limitation. In most cases the additive concentrate will comprise from 3% to 30% by weight of lubricant, 2% to 15% stabilizer, 25% to 80% particulate substrate and 5% to 30% water.

It may be noted that fillers to be blended with PVC resins are often pre-treated with other resins or stearic acid to improve their dispersability in the PVC during processing. If the filler is not properly dispersed, the final products made therefrom may exhibit poor tensile strength and/or a low modulus of elasticity. Incorporation of an aqueous emulsion into an untreated filler in accordance with the present process effectively coats the surfaces of the particles of the substrate, and the resulting product acts like the known treated fillers to produce products having a tensile strength and/or modulus of elasticity comparable to that of products made with the conventional treated fillers.

It has been further observed that untreated fillers are more receptive to water than treated fillers. Therefore if conventionally treated fillers are used as substrate powders in the present process, the water content of the emulsion and the proportions of emulsion and substrate should be so selected that the water content does not exceed 20% to 25% by weight of the mixture.

The additive concentrate is made up in a sufficient amount to provide the additives for a number of batches of PVC since it is storage stable over extended periods of time. When it is desired to incorporate additives in a batch of PVC molding resin, an aliquot portion of the concentrate is added to the PVC powder and mixed therewith in a high shear mixer. The quantity of concentrate used depends upon such factors as the composition of the concentrate and the nature of the properties desired in the blended PVC molding composition. Typically the concentrate is used in an amount of 2% to 10% by weight of the raw PVC polymer.

In order to point out more fully the nature of the present invention, the following specific Examples are given:

EXAMPLE 1 a. Preparation of Emulsion

A metal beaker was charged with 360 grams of a hydrocarbon wax (XL-165), 40 grams of an oxidized polyethylene wax (Epolene E-10), 24 grams of a montan derived wax (Hoechst Wax U) and 20 grams of a non-ionic alkyl phenol surfactant (Triton X-100). The components were melted by application of steam heat and when the mass was completely melted and a temperature of 110° C. attained, 6 grams of a 43% aqueous potassium hydroxide solution was added. After moderate stirring to effect saponification of the acid waxes, the melt was added to a second beaker containing 550 grams of water at 90° to 99° C. The water was vigorously stirred during addition of the waxes. The resulting emulsion was then crashed cooled to about 40° C.

One part of a non-ionic polyoxyethylene surfactant (Hoechst Emulsogen LP) was added to 99 parts of a liquid tin stabilizer (Thermolite T-31) of the type commonly used in the stabilization of PVC. 170 grams of the stabilizer/surfactant blend as thus prepared was stirred into the emulsion prepared as described above at ambient temperature to form a uniform aqueous dispersion of the lubricant, waxes and stabilizer.

b. Preparation of Additive Concentrate

A powder blend was prepared consisting of 60 grams of untreated calcium carbonate (Pure Stone Co. — Micro-fil No. 1) having a particle size of 1 to 6 microns, 20 grams of titanium dioxide having a particle size of 0.1 to 0.4 microns, 20 grams of an acrylic processing aid (Acryloid K120N) and 8 grams of calcium stearate having a particle size of 0.4 microns. The blend was prepared by placing the components in a circular drum which was rotated about various axes to effectively mix the ingredients. To the powder blend as thus prepared 58 grams of the emulsion prepared as described in (a) above were added. The blend of emulsion and dry blended powder was mixed until the components were uniformly dispersed. The resulting mixture was a slightly damp but free-flowing powder containing the several additives in the correct proportions for incorporation in the PVC.

c. Blending of Additive Concentrate with Resin

A high shear mixer was charged with 2000 grams of PVC resin powder and 166 grams of a concentrate prepared as described in (b) above was added to the mixer. Mixing of the resin and concentrate was initiated and continued until a temperature of 120° C. had been attained. The resin then cooled to room temperature by placing it in a ribbon blender. It was found that the various additives had been uniformly dispersed in the PVC.

EXAMPLE 2

The procedure of Example 1 was repeated except that the same amount of each of the following stabilizers was substituted for the T-31 stabilizer of Example 1:
dimethyl tin (Cincinnati Milacron TM-387)
diethyl tin (Cincinnati Milacron TM 692)
dibutyl tin (Cardinal CT-78)
dibutyl tin (Interstab T-801)
Essentially the same result was obtained as in Example 1.

EXAMPLE 3

A Diosna High Shear Mixer, Model No. KAN 200 was charged with 150 lbs. of Certain-Teed bulk PVC CT-1110 and 11.7 lbs. of an additive concentrate prepared as described in Example 1. The batch was mixed until it reached a temperature of 115° C. and then dumped into a cold mixer and cooled down to approximately 40° C. This compound was used to make a 4 inches pipe by extrusion in a Krauss-Maffei twin screw extruder KMD-90. The molding properties of the compound were compared to those of a compound containing equivalent amounts of the additives mixed in the conventional manner. The processing characteristics of the two compounds were essentially the same. Also the molded pipes showed improved physical properties, e.g., improved tensile strength and modulus of elasticity, as compared with pipes molded from compounds conventionally prepared to contain essentially the same amounts of the same processing additives.

It is, of course, to be understood that the foregoing Examples are intended to be illustrative only and that numerous changes can be made in the ingredients, proportions and conditions specifically disclosed therein without departing from the spirit of the invention as defined in the appended claims.

We claim:

1. The method of making a polyvinyl chloride molding composition which comprises preparing an aqueous emulsion containing from 10% to 45% by weight of a processing lubricant and from 3% to 30% by weight of stabilizer, mixing said emulsion with a finely divided particulate solid selected from fillers, pigments and mixtures thereof to form an additive concentrate in the form of a free-flowing powder containing no more than 30% by weight of water and mixing a portion of said concentrate with polyvinyl chloride to form said polyvinyl chloride molding composition.

2. A method according to claim 1 wherein said lubricant is a hydrocarbon wax.

3. A method according to claim 1 wherein said lubricant is a mixture of hydrocarbon wax, oxidized polyethylene wax and montan derived acid wax.

4. A method according to claim 1 and wherein said stabilizer is an organo-tin stabilizer.

5. A method according to claim 1 and wherein said lubricant comprises a hydrocarbon wax and an alkaline earth metal salt of an organic acid.

6. A method according to claim 1 wherein said lubricant is a mixture of hydrocarbon wax and calcium stearate.

7. A method according to claim 1 wherein said emulsion contains from 30% to 40% by weight of lubricant and from 10% to 15% by weight of stabilizer.

8. A method according to claim 1 wherein said pigment is titanium dioxide.

9. A method according to claim 1 wherein said filler is calcium carbonate.

10. A method according to claim 1 wherein said finely divided particulate solid includes an impact modifier.

11. A method according to claim 1 wherein said finely divided particulate solid includes a processing aid.

12. A polyvinyl chloride additive concentrate in the form of a free-flowing powder and consisting of a finely divided particulate substrate selected from pigments, fillers and mixtures thereof having a mixture of polyvinyl chloride processing lubricant and stabilizer deposited on the surfaces of the substrate particles.

13. An additive concentrate according to claim 12 wherein said substrate comprises a mixture of titanium dioxide and calcium carbonate.

14. An additive concentrate according to claim 12 wherein said processing lubricant is a wax and said stabilizer is an organo-tin compound.

15. The method of making a polyvinyl chloride additive concentrate which comprises preparing an aqueous emulsion containing from 10% to 45% by weight of processing lubricant and from 3% to 30% by weight of stabilizer, and mixing said emulsion with a finely divided particulate solid selected from fillers, pigments and mixtures thereof to form a free-flowing powder containing no more than 30% by weight of water.

16. A method according to claim 15 wherein the processing lubricant comprises one or more waxes and the stabilizer is an organo-tin compound.

17. A method according to claim 15 wherein said filler is calcium carbonate and said pigment is titanium dioxide.

* * * * *